(12) United States Patent
Nguyen

(10) Patent No.: US 9,408,019 B2
(45) Date of Patent: Aug. 2, 2016

(54) ACCESSING SERIAL CONSOLE PORT OF A WIRELESS ACCESS POINT

(71) Applicant: Aruba Networks Inc., Sunnyvale, CA (US)

(72) Inventor: Thomas Nguyen, Fremont, CA (US)

(73) Assignee: ARUBA NETWORKS, INC., Sunnyvale, CA (US)

(*) Notice: Subject to any disclaimer, the term of this patent is extended or adjusted under 35 U.S.C. 154(b) by 38 days.

(21) Appl. No.: 14/445,868

(22) Filed: Jul. 29, 2014

(65) Prior Publication Data
US 2016/0037285 A1 Feb. 4, 2016

(51) Int. Cl.
*H04B 7/00* (2006.01)
*G05B 19/00* (2006.01)
*H04W 4/00* (2009.01)
*H04W 24/02* (2009.01)
*H04W 88/08* (2009.01)

(52) U.S. Cl.
CPC .............. *H04W 4/008* (2013.01); *H04W 4/001* (2013.01); *H04W 24/02* (2013.01); *H04W 88/08* (2013.01)

(58) Field of Classification Search
CPC ........... H04B 5/00; H04B 7/00; H04W 84/12; H04W 88/08
USPC ........................ 455/41.1, 41.2, 41.3; 370/328; 340/5.27, 5.61, 542
See application file for complete search history.

(56) References Cited

U.S. PATENT DOCUMENTS

| | | | | |
|---|---|---|---|---|
| 7,113,073 B2* | 9/2006 | Taylor | ..................... | H04L 63/10 370/328 |
| 7,957,777 B1* | 6/2011 | Vu | ........................... | H04W 4/20 370/311 |
| 2013/0113993 A1* | 5/2013 | Dagit, III | ................ | G06F 3/017 348/552 |
| 2013/0242966 A1* | 9/2013 | Zhou | ..................... | H04W 24/02 370/338 |
| 2014/0164186 A1* | 6/2014 | Lee | ........................... | G06F 8/61 705/26.61 |

* cited by examiner

*Primary Examiner* — Quochien B Vuong
(74) *Attorney, Agent, or Firm* — Hewlett Packard Enterprise Patent Department

(57) ABSTRACT

A computer readable medium includes instructions which cause performance of operations to configure an access point, including receiving, by a wireless communication controller, wireless communication signals detected by a wireless communication antenna. The access point includes the wireless communication antenna, the wireless communication controller, and a System-On-Chip (SOC) having a serial port configured for receiving input from the wireless communication controller. The wireless communication signals include configuration commands. The operations further include generating, by the wireless communication controller, serial signals based on the wireless communication signals, the serial signals including the configuration commands. The operations further include receiving, by the SOC from the wireless communication controller, the serial signals including the configuration commands in the wireless communication signals detected by the wireless communication antenna, and configuring the access point based on the configuration commands received in the wireless communication signals detected by the wireless communication antenna.

20 Claims, 3 Drawing Sheets

ACCESSING SERIAL CONSOLE PORT OF A WIRELESS ACCESS POINT

BACKGROUND

After resetting a wireless access point (AP), the administrator user typically needs to re-establish communication with the central processing unit (CPU) of the AP to obtain status information and to configure the AP into a correct operating mode. In a traditional AP design, the serial console port is the only interface that allows the administrator user to communicate with the AP's CPU immediately after the AP's boot up, prior to establishing the operating system and loading additional hardware drivers. All other interfaces only operate after the operating system is established and additional hardware drivers are loaded. If the AP is at a location that is within reach of the administrator user, such as a laboratory work bench, a physical cable (e.g., a serial port cable) can be used to connect an administrator user's computer to the serial console port of the AP to perform the necessary configuration procedure. Once the AP is mounted on a location that is difficult to reach physically, such as a ceiling, it is very difficult to access the serial console port of the AP through the serial port cable.

OVERVIEW

In general, in one aspect, embodiments relate to a non-transitory computer readable medium including instructions. The instructions, when executed by one or more hardware processors, cause performance of operations to configure an access point, including receiving, by a wireless communication controller, wireless communication signals detected by a wireless communication antenna. The access point includes the wireless communication antenna, the wireless communication controller, and a System-On-Chip (SOC) having a serial port configured for receiving input from the wireless communication controller. The wireless communication signals include one or more configuration commands. The operations further include generating, by the wireless communication controller, serial signals based on the wireless communication signals, the serial signals including the configuration commands. The operations further include receiving, by the SOC from the wireless communication controller, the serial signals including the configuration commands in the wireless communication signals detected by the wireless communication antenna, and configuring the access point based on the configuration commands received in the wireless communication signals detected by the wireless communication antenna.

In general, in one aspect, embodiments relate to an access point including a wireless communication antenna, a wireless communication controller, and a System-On-Chip (SOC) including a serial port configured for receiving input from the wireless communication controller. The access point is configured to perform operations including receiving, by the wireless communication controller, wireless communication signals detected by the wireless communication antenna, the wireless communication signals including configuration commands. The operations further include generating, by the wireless communication controller, serial signals based on the wireless communication signals, the serial signals including the configuration commands. The operations further include receiving, by the SOC from the wireless communication controller, the serial signals including the configuration commands in the wireless communication signals detected by the wireless communication antenna, and configuring the access point based on the configuration commands received in the wireless communication signals detected by the wireless communication antenna.

In general, in one aspect, embodiments relate to an access point comprising a Bluetooth® antenna, a Bluetooth® controller, a System-On-Chip (SOC) including a serial port configured for receiving input from the Bluetooth® controller. The access point is configured to perform operations including receiving, by the Bluetooth® controller, Bluetooth® signals detected by the Bluetooth® antenna, the Bluetooth® signals including configuration commands. The operations further include generating, by the Bluetooth® controller, serial signals based on the Bluetooth® signals, the serial signals comprising the configuration commands. The operations further include receiving, by the SOC from the Bluetooth® controller, the one or more serial signals including the configuration commands in the Bluetooth® signals detected by the Bluetooth® antenna, and configuring the access point based on the configuration commands received in the Bluetooth® signals detected by the Bluetooth® antenna.

Other aspects will be apparent from the following description and the appended claims.

DETAILED DESCRIPTION

Figure 1:
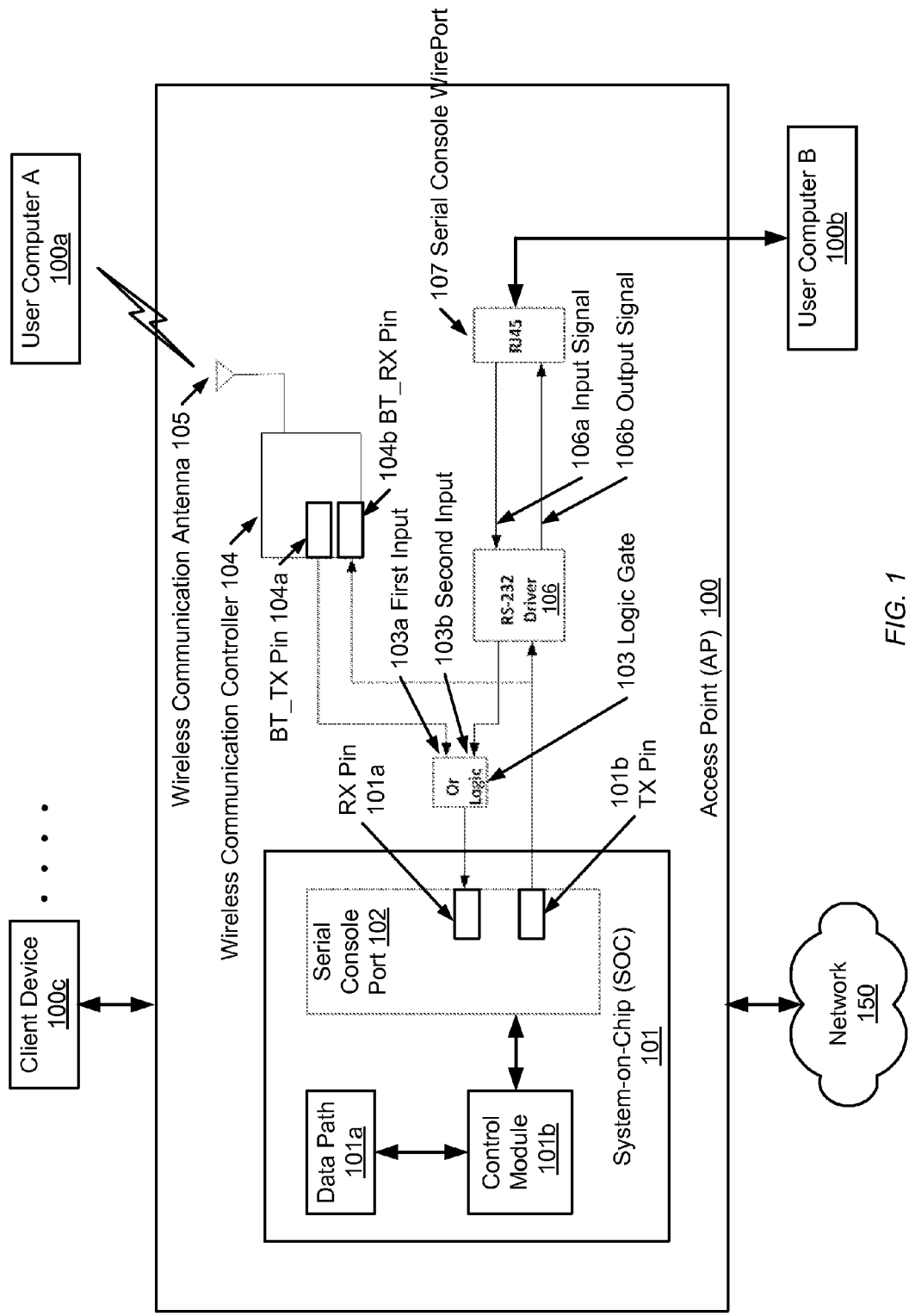
FIG. 1 shows a system in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In general, embodiments provide a wireless access point (AP) configured with a wireless access mechanism for accessing the serial console port of the AP. Specifically, the wireless access mechanism operates independent of the AP's CPU and allows accessing the AP's CPU independent of the operating system and hardware driver that executes on the AP's CPU. In one or more embodiments, the wireless access mechanism includes a Bluetooth® circuit, which is an independent entity from the AP's CPU subsystem and includes it's own CPU, memory, serial interface, and wireless radio circuit. The serial interface of the Bluetooth® circuit is logically OR'ed with the interface circuit of the AP's serial console port. This logic OR function allows the administrator user to access the serial console port directly using a physical serial cable, or to access the serial console port wirelessly via the Bluetooth® circuit.

FIG. 1 shows a schematic diagram of a system (100) in accordance with one or more embodiments. As shown in FIG. 1, the system includes an access point (AP) (100), client devices (e.g., client device (100c)), a network (150), a user computer A (100a), and a user computer B (100b). Further, the AP (100) includes a System-On-Chip (SOC) (101), a logic gate (103), a wireless communication controller (104), an antenna (105), a RS-232 driver (106), and a serial control wireport (107). Each of these components is discussed below in accordance with one or more embodiments.

In one or more embodiments, a user computer (e.g., user computer A (100a), user computer B (100b)) is a computing device used by a administrator user (e.g., an engineer, a technical support personnel, an information technology technician, etc.) to access the AP (100) for performing a system administration task, such as reset, debug, configuration, or other management tasks. In one or more embodiments, the user computer (e.g., user computer A (100a), user computer B (100b)) may be one or more mobile devices (e.g., laptop computer, smart phone, personal digital assistant, tablet computer, or other mobile device), gaming console, desktop computers, servers, blades in a server chassis, or any other type of electronic device or devices that include at least the minimum processing power, memory, and input and output device(s) to perform the aforementioned system administration task. Additional details of an example of the user computer A (100a) and user computer B (100b) are described in reference to FIG. 3 below.

In one or more embodiments, a client device (e.g., client device (100c)) is a hardware component that is used by a network user (separate from the administrator user) to receive a service from network resources (e.g., a server) via the network (150). In one or more embodiments, the client device (e.g., client device (100c)) may be one or more mobile devices (e.g., laptop computer, smart phone, personal digital assistant, tablet computer, or other mobile device), gaming console, desktop computers, servers, blades in a server chassis, or any other type of electronic device or devices that include at least the minimum processing power, memory, and input and output device(s) to perform a user task (separate from the system administration task) for the network user using the aforementioned service from the network resources. For example, the network user may access a network application running on a network server to perform a user task, such as browsing a website, making an online purchase, etc. Additional details of an example of the client device (100c) are described in reference to FIG. 3 below.

The client device (100c) may be connected to the network (150) via a network interface connection (not shown) and an AP (e.g., AP (100)). The network (150) may be a local area network (LAN), a wide area network (WAN) such as the Internet, mobile network, or any other type of network, or a combination of networks. The client device (100c) that connects to the network (150) via the AP (100) is referred to as connected to the AP (100). Typically, the client device (100c) may be within wireless signal range of multiple APs but connects to a single AP (e.g., AP (100)) at any particular time.

An AP (e.g., AP (100)) is a digital hardware device that may be communicatively coupled to the network (150). The AP (e.g., AP (100)) is a separate hardware unit from a client device (e.g., client device (100c)), that is directly, wired or wirelessly, connected to the client device (e.g., client device (100c)) and is in a communication path from the client device (e.g., client device (100c)) to the network (150). By way of an example, the AP (100) may communicate wirelessly with client devices (e.g., client device (100c)) using Wi-Fi, Bluetooth® or related standards. The AP (100) may be connected to any number of client devices at any moment in time. Specifically, the AP (100) may be connected to no client devices, a single client device, or multiple client devices at any particular moment in time.

In one or more embodiments, the AP (100) includes the SOC (101) that is configured to transmit and receive data packets along the communication path from the client device (e.g., client device (100c)) to the network (150). Generally, the term "SOC" refers to an integrated circuit that integrates all components of an electronic system into a single chip. It may contain digital, analog, mixed-signal, and radio-frequency functions all on a single chip substrate. As shown in FIG. 1, the SOC (101) includes a serial console port (102), a data path (101a), and a control module (101b). In one or more embodiments, the data path (101) includes hardware and software components that provide the data packet transmission functionality of the AP (100). In one or more embodiments, the data packet transmission activity of the data path (101a) may be controlled and/or monitored by the control module (101b). The data path (101a) and the control module (101b) may include a CPU subsystem of the AP (100). For example, the control module (101b) may include a CPU for executing an operating system and various hardware drivers to control and/or monitor the data packet transmission activity of the data path (101a). In one or more embodiments, immediately after the AP (101) reboots from a reset condition, the control and/or monitor functionality of the control module (101b) may be configured via the serial console port (102) prior to loading the operating system and additional hardware drivers. In one or more embodiments, the serial console port (102) is a serial port that includes an input pin RX pin (101a) and an output pin TX pin (101b).

As shown in FIG. 1, the input received by the serial console port (102) is based on a logic OR output of the logic gate (103) that is presented to an input pin (i.e., RX pin (101a)) of the serial console port (102). In addition, the serial console port (102) is configured to send output (in a serial data format) to both the wireless communication controller (104) and the serial control wireport (107) from an output pin (i.e., TX pin (101b)) of the serial console port (102).

In one or more embodiments, the serial console port (102) is configured to receive input (in a serial data format) from the wireless communication controller (104) or the serial control wireport (107) based on a status of the logic gate (103). For example, the logic gate (103) may include a logic OR gate or other circuit element providing logic OR function. In particular, the logic gate (103) has a first input (103a) coupled to the wireless communication controller (104), and a second input (103b) coupled to the serial console wireport (107). Accordingly, the status of the logic gate (103) may include at least a first status and a second status.

In one or more embodiments, the logic gate (103) is put in the first status by disconnecting any physical cable from the serial console wireport (107). In one or more embodiments, the logic gate (103) is put in the first status without any further user intervention in addition to disconnecting any physical cable from the serial console wireport (107). For example, the AP (100) may be mounted on a ceiling or a difficult to reach location without any physical cable connection. In one or more embodiments, the second input (103b) of the logic gate (103) may be strapped to an inactive state when no physical cable is connected to the serial console port (107). When the logic gate (103) is in the first status, the output of the logic gate (103) follows the first input (103a) of the logic gate (103) that is coupled to the wireless communication controller (104).

In one or more embodiments, when the logic gate (103) is put in the first status, an administrator user may use the user computer A (100a) to send commands to the control module (101b) via the serial console port (102), or to retrieve status information from the control module (101b) via the serial console port (102). In particular, the administrator user may use the user computer A (100a) to access the serial console port (102) wirelessly via the wireless communication antenna (105) and wireless communication controller (104). The wireless communication antenna (105) is an electrical device which converts radio waves into an electrical signal, and vice versa. The wireless communication controller (104) is an electronic circuit for exchanging data among wireless devices based on the electrical signal received and/or transmitted using the wireless communication antenna (105). In one or more embodiments, the wireless communication controller (104) includes a Bluetooth® controller. Bluetooth® is a wireless technology standard for exchanging data over short distances using short-wavelength UHF radio waves in the ISM band from 2.4 to 2.485 GHz. As shown in FIG. 1, the wireless communication controller (104) includes an output pin (i.e., BT_TX pin (104*a*)) coupled to a first input (103*a*) of the logic gate (103) and in turn to the RX pin (101*a*) of the serial console port (102). In addition, the wireless communication controller (104) includes an input pin (i.e., BT_RX pin (104*b*)) coupled to the TX pin (101*b*) of the serial console port (102).

In one or more embodiments, the logic gate (103) is put in the second status by disabling all wireless communication connection(s) to the wireless communication controller (104). In one or more embodiments, the logic gate (103) is put in the second status without any further user intervention that is in addition to disabling all wireless communication connection(s) to the wireless communication controller (104). For example, the first input (103*a*) of the logic gate (103) may be strapped to an inactive state when no wireless communication connection to the wireless communication controller (104) is established. When the logic gate (103) is in the second status, the output of the logic gate (103) follows a second input (103*b*) of the logic gate (103) that is coupled to the serial console wireport (107). In one or more embodiments, when the logic gate (103) is put in the second status, an administrator user may use the user computer B (100*b*) to send commands to the control module (101*b*) via the serial console port (102) or to retrieve status information from the control module (101*b*) via the serial console port (102). In particular, the administrator user may use the user computer B (100*b*) to access the serial console port (102) via a physical cable (not shown) connected to the serial console wireport (107). For example the physical cable may be a serial console port cable connected to a RJ45 connector (i.e., serial console wireport (107)). Specifically, the input signal (106*a*) received from the user computer B (100*b*) via the serial console port cable may be conditioned or buffered using the RS-232 driver (106) before presenting to a second input (103*b*) of the logic gate (103) and in turn to the RX pin (101*a*) of the serial console port (102). Similarly, the output from the TX pin (101*b*) of the serial console port (102) may be conditioned or buffered using the RS-232 driver (106) before presenting as the output signal (106*b*) to the RJ45 connector (i.e., serial console wireport (107)) for sending to user computer B (100*b*) via the serial port cable.

While FIG. 1 shows a configuration of components, other configurations may be used without departing from the scope of the claims. For example, various components may be combined to create a single component. As another example, the functionality performed by a single component may be performed by two or more components.

Figure 2:
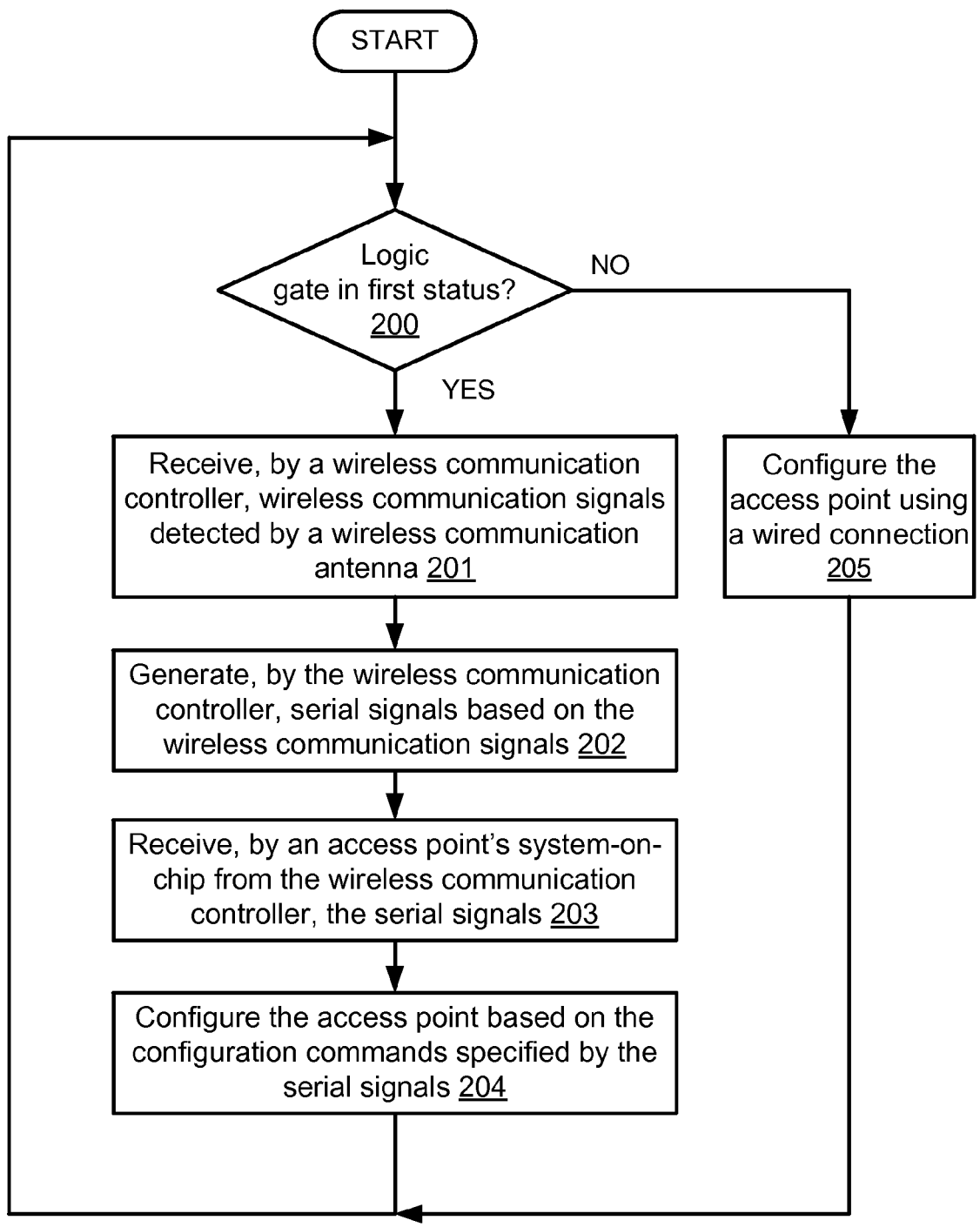
FIG. 2 shows a flow chart of a method in accordance with one or more embodiments.

FIG. 2 shows a method flow chart in accordance with one or more embodiments. In one or more embodiments, the method of FIG. 2 may be practiced using the system (100) described in reference to FIG. 1 above. In one or more embodiments, one or more of the steps shown in FIG. 2 may be omitted, repeated, and/or performed in a different order than that shown in FIG. 2. Accordingly, the specific arrangement of steps shown in FIG. 2 should not be construed as limiting the scope.

Initially in Step 200, a determination is made as to whether a logic gate is in the first status. For example, the logic gate and the status of the logic gate are as described in reference to FIG. 1 above. If the logic gate is determined to be in the first status, the method proceeds to Step 201. If the logic gate is determined not to be in the first status, for example the logic gate may be determined to be in the second status, the method proceeds to Step 205.

In Step 201, one or more wireless communication signals detected by a wireless communication antenna are received by a wireless communication controller. For example, the one or more wireless communication signals may be received from a user computer used by an administrator user to configure an access point. In one or more embodiments, the wireless communication signals specify one or more configuration commands, such as a reset command, a debug command, a network provisioning command, etc.

In Step 202, one or more serial signals are generated by the wireless communication controller based on the one or more wireless communication signals. Consistent with the one or more wireless communication signals, the one or more serial signals specify the same configuration command(s).

In Step 203, the one or more serial signals from the wireless communication controller are received by a System-On-Chip (SOC) component of an access point. Accordingly, the SOC receives the one or more configuration commands in the wireless communication signals originally detected by the wireless communication antenna.

In Step 204, the access point is configured (e.g., reset, debugged, provisioned, etc.) based on the one or more configuration commands received in the one or more wireless communication signals detected by the wireless communication antenna. Once the access point is configured based on the one or more wireless communication signals, the method returns to Step 200 in anticipation of additional configuration commands from the administrator user.

Returning to the discussion of Step 200, if the logic gate is determined not to be in the first status, for example the logic gate may be determined to be in the second status, the method proceeds to Step 205. In Step 205, the access point is configured using a wired connection. For example, the wired connection may include the physical serial cable and the serial console wireport described in reference to FIG. 1 above. Once the access point is configured based on the wired connection, the method returns to Step 200 in anticipation of additional configuration commands from the administrator user.

Figure 3:
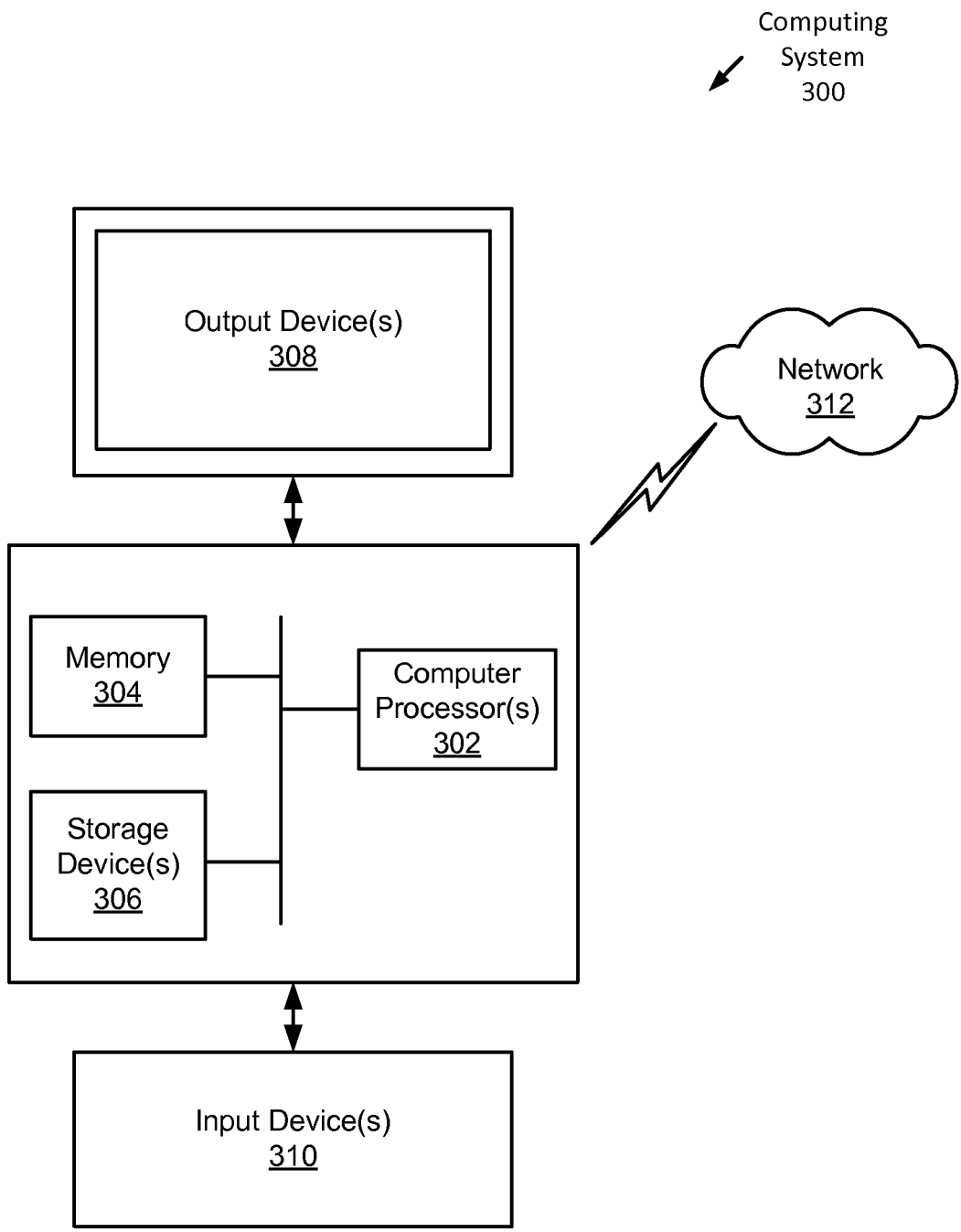
FIG. 3 shows a computing system in accordance with one or more embodiments.

Embodiments may be implemented on virtually any type of computing system regardless of the platform being used. For example, the computing system may be one or more mobile devices (for example, laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 3, the computing system (300) may include one or more computer processor(s) (302), associated memory (304) (for example, random access memory (RAM), cache memory, flash memory, etc.), one or more storage device(s) (306) (for example, a hard disk, an optical drive such as a compact disk (CD) drive or digital versatile disk (DVD) drive, a flash memory stick, etc.), and numerous other elements and functionalities. The computer processor(s) (302) may be an integrated circuit for processing instructions. For example, the computer processor(s) may be one or more cores, or micro-cores of a processor. The computing system (300) may also include one or more input device(s) (310), such as a touchscreen, keyboard, mouse, microphone, touchpad, electronic pen, or any other type of input device. Further, the computing system (300) may include one or more output device(s) (308), such as a screen (for example, a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (300) may be connected to a network (312) (for example, a local area network (LAN), a wide area network (WAN) such as the Internet, mobile network, or any other type of network) via a network interface connection (not shown). The network (312) may be substantially the same as the network (150) described in reference to FIG. 1 above. Further, the computing system (30) may be connected to the network (312) via an access point (AP), such as the AP (100) described in reference to FIG. 1 above. The input and output device(s) may be locally or remotely (for example, via the network (312)) connected to the computer processor(s) (302), memory (304), and storage device(s) (306). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (300) may be located at a remote location and connected to the other elements over a network (312). Further, embodiments may be implemented on a distributed system having a plurality of nodes, where each portion may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While embodiments have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. An access point comprising:
   a Bluetooth® antenna;
   a Bluetooth® controller;
   a logic gate;
   a System-On-Chip (SOC) comprising a serial port configured for receiving input from the Bluetooth® controller based on a status of the logic gate;
   the access point being configured to perform operations comprising:
      receiving, by the Bluetooth® controller, one or more Bluetooth® signals detected by the Bluetooth® antenna, wherein the one or more Bluetooth® signals comprise configuration commands;
      generating, by the Bluetooth® controller, one or more serial signals based on the one or more Bluetooth® signals, the one or more serial signals comprising the configuration commands;
      receiving, by the SOC from the Bluetooth® controller, the one or more serial signals comprising the configuration commands in the Bluetooth® signals detected by the Bluetooth® antenna; and
      configuring the access point based on the configuration commands received in the one or more Bluetooth® signals detected by the Bluetooth® antenna in response to the status of the logic gate.

2. The access point of claim 1, wherein the serial port, of the SOC, is further configured to receive input from a serial console wireport.

3. The access point of claim 2, wherein the serial port of the SOC is configured to receive input from either the serial console wireport or the Bluetooth® controller based on the status of the logic gate.

4. The access point of claim 3, wherein the logic gate comprises a logic OR function.

5. The access point of claim 1, wherein the configuration commands, received in the one or more Bluetooth® signals detected by the Bluetooth® antenna, comprise one or more commands for provisioning the access point.

6. The access point of claim 1, wherein the configuration commands, received in the Bluetooth® signals detected by the Bluetooth® antenna, comprise one or more commands for debugging the access point.

7. The access point of claim 1, wherein the configuration commands, received in the Bluetooth® signals detected by the Bluetooth® antenna, comprise one or more commands for monitoring the operation of the access point.

8. An access point comprising:
   a wireless communication antenna;
   a wireless communication controller;
   a logic gate;
   a System-On-Chip (SOC) comprising a serial port configured for receiving input from the wireless communication controller based on a status of the logic gate;
   the access point being configured to perform operations comprising:
      receiving, by the wireless communication controller, one or more wireless communication signals detected by the wireless communication antenna, wherein the one or more wireless communication signals comprise one or more configuration commands;
      generating, by the wireless communication controller, one or more serial signals based on the one or more wireless communication signals, the one or more serial signals comprising the one or more configuration commands;
      receiving, by the SOC from the wireless communication controller, the one or more serial signals comprising the one or more configuration commands in the wireless communication signals detected by the wireless communication antenna; and
      configuring the access point based on the one or more configuration commands received in the one or more wireless communication signals detected by the wireless communication antenna in response to the status of the logic gate.

9. The access point of claim 8, wherein the serial port of the SOC is further configured to receive input from a serial console wireport.

10. The access point of claim 9, wherein the serial port of the SOC is configured to receive input from either the serial console wireport or the wireless communication controller based on the status of the logic gate.

11. The access point of claim 10, wherein the logic gate comprises a logic OR function.

12. The access point of claim 8, wherein the one or more configuration commands, received in the one or more wireless communication signals detected by the wireless communication antenna, comprise one or more commands for provisioning the access point.

13. The access point of claim 8, wherein the one or more configuration commands, received in the one or more wireless communication signals detected by the wireless communication antenna, comprise one or more commands for debugging the access point.

14. The access point of claim 8, wherein the one or more configuration commands, received in the one or more wireless communication signals detected by the wireless communication antenna, comprise one or more commands for monitoring the operation of the access point.

15. A non-transitory computer readable medium comprising instructions which, when executed by one or more hardware processors, cause performance of operations to configure an access point comprising:

receiving, by a wireless communication controller, one or more wireless communication signals detected by a wireless communication antenna, wherein the access point comprises the wireless communication antenna, the wireless communication controller, a logic gate, and a System-On-Chip (SOC) having a serial port configured for receiving input from the wireless communication controller based on a status of the logic gate, wherein the one or more wireless communication signals comprise one or more configuration commands;

generating, by the wireless communication controller, one or more serial signals based on the one or more wireless communication signals, the one or more serial signals comprising the one or more configuration commands;

receiving, by the SOC from the wireless communication controller, the one or more serial signals comprising the one or more configuration commands in the one or more wireless communication signals detected by the wireless communication antenna; and configuring the access point based on the one or more configuration commands received in the one or more wireless communication signals detected by the wireless communication antenna in response to the status of the logic gate.

16. The non-transitory computer readable medium of claim 15, wherein the serial port, of the SOC, is further configured to receive input from a serial console wireport.

17. The non-transitory computer readable medium of claim 16, wherein the serial port, of the SOC, is configured to receive input from either the serial console wireport or the wireless communication controller based on the status of the logic gate.

18. The non-transitory computer readable medium of claim 17, wherein the one or more configuration commands, received in the one or more wireless communication signals detected by the wireless communication antenna, comprise one or more commands for provisioning the access point.

19. The non-transitory computer readable medium of claim 15, wherein the one or more configuration commands, received in the one or more wireless communication signals detected by the wireless communication antenna, comprise one or more commands for debugging the access point.

20. The non-transitory computer readable medium of claim 15, wherein the one or more configuration commands, received in the one or more wireless communication signals detected by the wireless communication antenna, comprise one or more commands for monitoring the operation of the access point.

* * * * *